Jan. 22, 1963   R. M. LAPEROUSE   3,074,821
METHOD FOR MAKING SOFT OR BROWN SUGAR
Filed May 31, 1960   2 Sheets-Sheet 1

Robert M. Laperouse
INVENTOR.

BY Bertram H. Mann
ATTORNEY

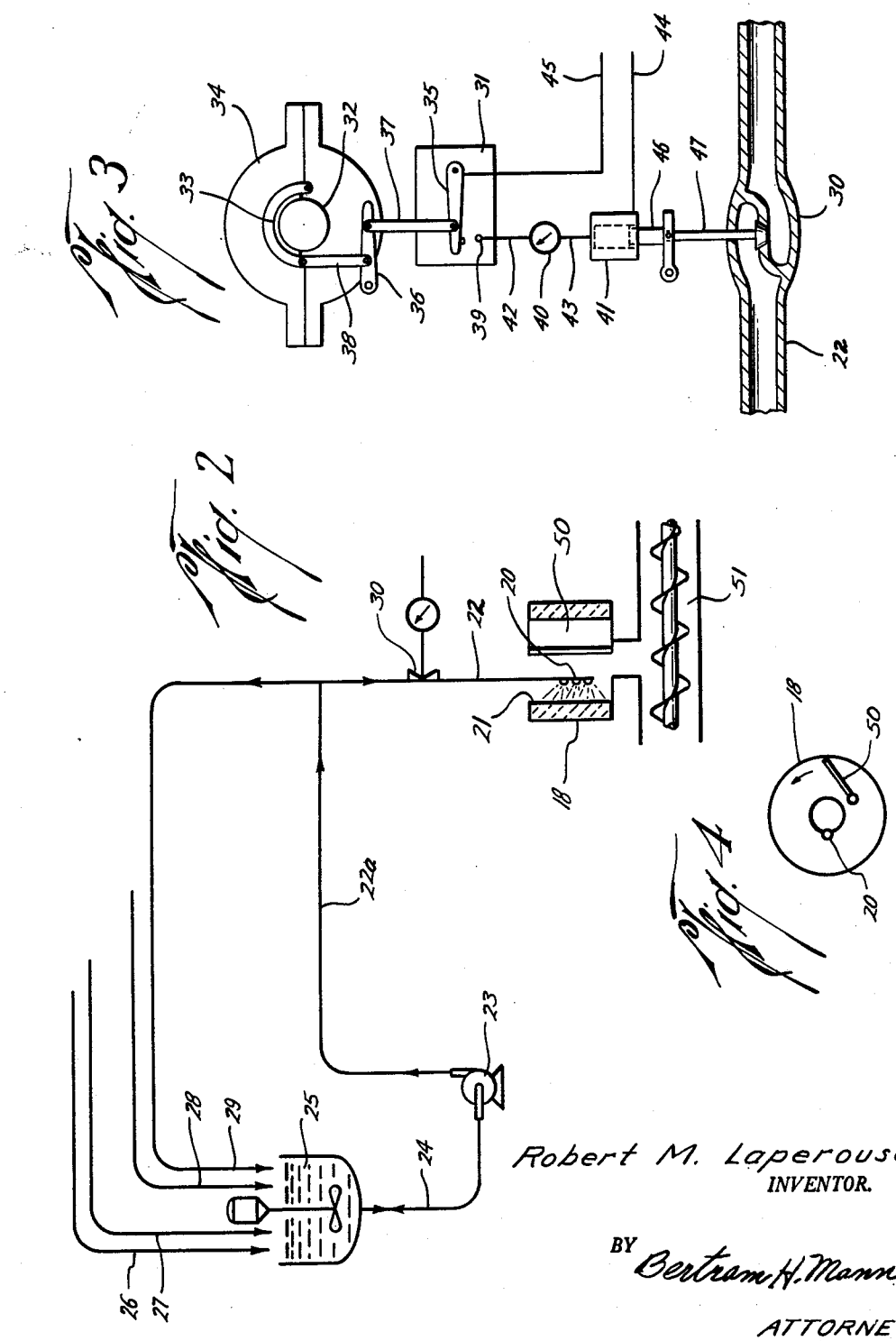

3,074,821
METHOD FOR MAKING SOFT OR BROWN SUGAR
Robert M. Laperouse, Sugar Land, Tex., assignor to Imperial Sugar Company, Sugar Land, Tex., a corporation of Texas
Filed May 31, 1960, Ser. No. 32,930
2 Claims. (Cl. 127—63)

This invention relates to methods of and apparatus for manufacturing brown or soft sugars.

An increase in the demand of soft or brown sugar is desirable from the point of view of the sugar refinery, because it permits a decrease in the production of black strap molasses, a low value by-product, with proportionate increase of higher value consumer sugar. Soft or brown sugar, as normally produced, consists of pure sucrose crystals with a molasses coating which imparts the characteristic flavor and color and contains non-sugar substances in addition to a small proportion of invert sugar. However, such normally-produced brown sugars have the disadvantage of tending to harden or cake in the package. Moreover, some brown sugars as produced by ordinary methods do not have desirable color or flavor characteristics. While it is customary to add sugar syrup to the brown sugar massecuite for controlling the color and quality of the brown sugar strike, it is impossible by this method to increase the invert content sufficiently to prevent hardening of the brown sugar.

Accordingly, an object of the present invention is to provide a novel method and apparatus for producing brown or soft sugar which is improved in its reduced tendency to harden or lump in the package.

Another object is to provide novel means and method for manufacturing improved brown sugar by a supplemental step during the normal refining process.

Still another object is to provide novel means and method for supplementing the coating of sucrose crystals in soft or brown sugars by the addition of controlled quantities of invert syrup which, due to its hygroscopic character, substantially contributes to retaining the sugar in soft condition.

The above objects and others are obtained substantially in my novel apparatus and method which consists, generally, in repeated affining, centrifuging, filtration, and boiling steps, as more or less customarily used in making of brown or soft sugar, in addition to treatment of what, normally, is the end product. The separated brown sugar in the final centrifugal separation step is spray-coated with controlled quantities of invert syrup so that each crystal is provided with a small additional quantity of invert. The invert may be added during the braking or the plowing period of the brown sugar centrifugal when the spinning rate is reduced sufficiently to prevent the moist, invert coating from being thrown off.

In the accompanying drawing:

FIG. 2 is a flow chart illustrating the making and supplying of invert syrup.

FIG. 3 is a schematic representation of the automatic invert valve control.

FIG. 4 is a schematic top view of the brown sugar centrifugal.

Figure 1:
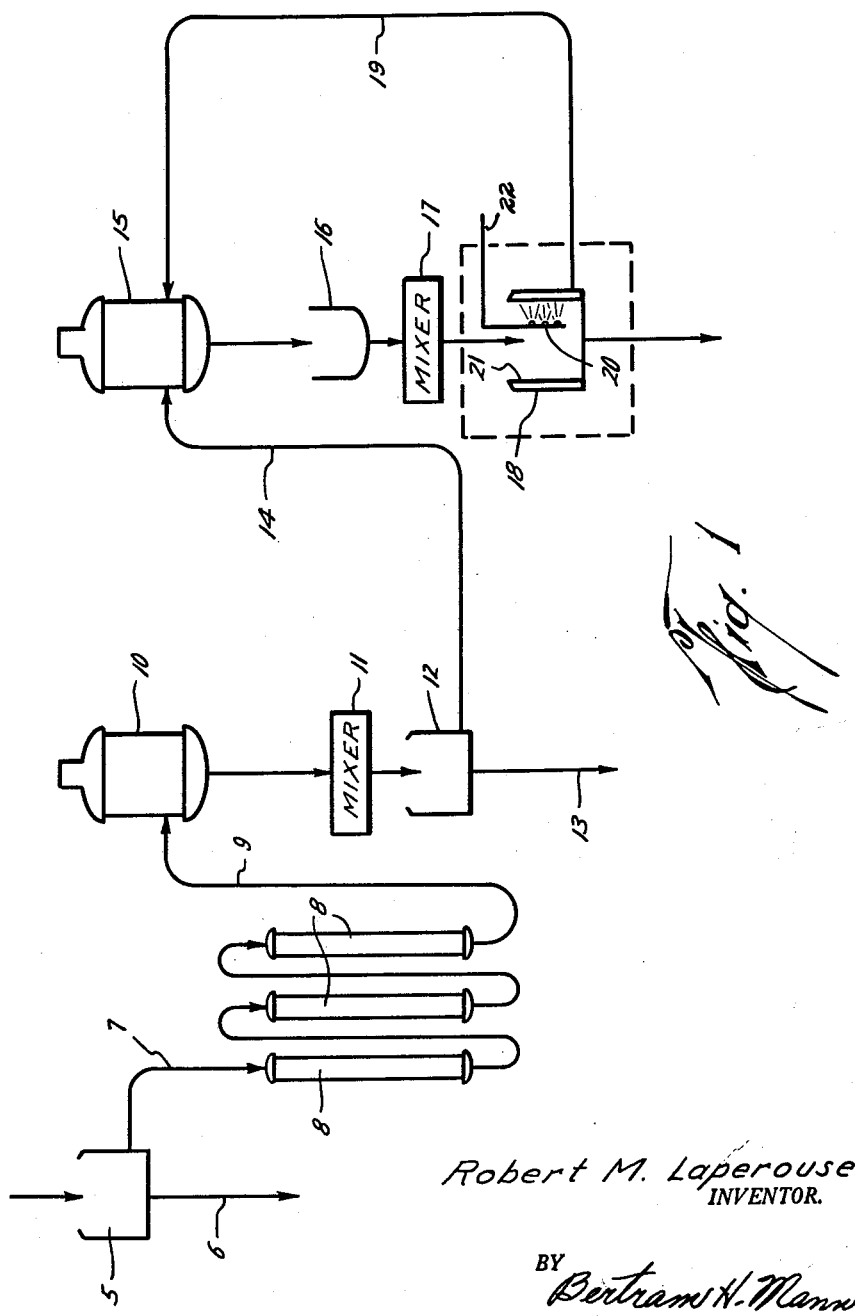
FIG. 1 is a schematic flow chart illustrating the novel process and apparatus.

Starting at the left-hand side of FIG. 1, there is illustrated a first or wash plant centrifuge 5 which is charged with the magma of raw sugar and syrup. Separated solids from this operation take the path 6 for additional refining steps not here pertinent. The syrup or affination thrown off from centrifugal separator 5 is led through piping 7 to a series of bone char filter towers 8, thence the so-called filtered second is led by piping 9 to low grade refined vacuum pan 10. The charge in pan 10 is boiled by application of vacuum to cause partial crystallization. The resultant mixture of thickened syrup and crystals is then delivered through mixer 11 to low grade refined centrifugal separator 12. The solids resulting from centrifuging in 12 take the path 13 as filtered second refined sugar for further disposition.

The filtered second syrup follows piping 14 to brown sugar vacuum pan 15 where the charge is again boiled and crystallized. The brown sugar massecuite from pan 15 passes through a crystallizer 16 and mixer 17 and is fed into brown sugar centrifugal basket 18. The massecuite charge is then spun to separate brown sugar crystals from the coating syrup which is re-fed through piping 19 to brown sugar vacuum pan 15 as a color and purity control for the brown sugar strike in the pan. The solids in basket 18 are scraped off by a scraper or plow 50 and drop into a conveyor screw 51 for movement to other handling points. All of the above steps are more or less well known and may be modified in various ways for the production of brown sugar of the type and quality desired.

Mounted within brown sugar centrifugal 18 is a spray nozzle, schematically represented at 20 and positioned to direct fluid material injected therethrough against screen 21 within the centrifuge to which separated sugar crystals adhere. Nozzle 20 is connected by piping 22 (FIG. 2), 22a to a centrifugal pump 23, thence by piping 24 to an inverting tank 25. Supply lines 26, 27, and 28 lead into tank 25 as well as recirculation line 29. Supply line 26 is for the introduction of liquid sucrose, the basic ingredient. Line 27 serves for the admission of concentrated hydrochloric acid while line 28 supplies sodium hydroxide for neutralizing the product after inversion is complete.

At 30 there is shown a valve controlling line 22 leading to spray nozzle 20. FIG. 3 shows, schematically, the control for valve 30, and, therefore, for controlled supply of pressured invert syrup through nozzle 20. Casing 31 encloses the cyclical controls for centrifugal basket 18. The basket is rotated by known mechanism including a vertical drive shaft having a brake drum portion indicated at 32, which has a cooperating brake shoe 33 pivotally mounted on support 34. The brake shoe is actuated from controls 31 through levers 35 and 36 and links 37 and 38. Lever 35 operates a switch 39 which is included with a timer 40, solenoid 41, and wiring 42 and 43 in an electrical power circuit 44, 45. Solenoid 41 has an armature 46 which is connected by a rod 47 to valve 30. The arrangement is such that when solenoid 41 is energized, valve 30 is opened to permit the passage of pressured fluid through line 22 to nozzle 20. Energization of solenoid 41 is initiated by the action of control mechanism 31 which applies brake 33 for retarding the rotation of centrifugal basket 18, then reverses the direction of rotation of the basket and actuates plow 50. The exact timing of the valve action is controlled by timer 40, which may be adjusted both to vary the time and period of opening of valve 30.

It is believed that the practice of the present method will be clear from the above description. Controller 31 will cause cycled operation of brown sugar centrifugal 18, first to accelerate the spinning of the basket in the direction indicated by the arrow in FIG. 4, then to continue the spinning at the desired rate for a predetermined period to separate the crystals from their syrup coating, then to cut off the powering of the basket and apply brake 33 for stopping the spinning action, then to rotate basket 18 in the reverse direction and advance plow 19 for scraping the sugar crystals from the basket. During the scraping or plowing phase, when the rate of spinning is sufficiently low that moist coatings on the separated crystals in the basket will not be thrown off, a carefully measured quantity of invert syrup will be automatically injected through nozzle 20 for coating the crystals to the desired extent in advance of the plow. The freshly coated crystals will be scraped from the basket and dropped into conveyor screw 51 which, additionally, jostles the crystals to aid in spreading the invert coating evenly thereon. Preferably, the invert ingredient is increased from the normal 2% to 3% of commercial brown sugar to approximately 6%. Alternatively, the invert spray may be turned on during the braking period or even during an individual part of the cycle when the rate of spinning is low.

The improved soft sugar manufactured by my novel process and apparatus will retain its soft quality much longer than ordinary brown or soft sugar, even after opening of the package, due to the increased hygroscopic effect imparted by the augmented invert coating. Of course, it would be possible to supply additional coating ingredients through nozzle 20 where other than hydroscopic characteristics are to be added. For instance, color and flavor may be improved by adding properly selected syrups. As previously explained, it is not practical to attempt to increase the hygroscopic nature of soft sugar merely by recirculation of the centrifuged syrup, as through the line 19 which communicates with the brown sugar vacuum pan.

The various apparatus units have not been illustrated or described in detail since they are more or less conventional in the sugar refining industry and these units may be modified and supplemented in various ways as will occur to those skilled in the art. For instance, valve 30 may be of any suitable type and its control may be hydraulic, pneumatic, or even mechanical. The exclusive use of all modifications as come within the scope of the appended claims is contemplated.

I claim:
1. A method of making improved brown sugar, said method comprising the steps of
centrifuging brown sugar massecuite at sufficient speed to separate brown sugar crystals from the molasses coating thereof and thereby reduce the inverted content of the brown sugar to approximately 2 to 3%,
reducing the centrifuging speed sufficiently to retain the moist coatings on the brown sugar crystals,
plowing out the brown sugar crystals with retained moisture coating thereon during the reduced centrifuging of the brown sugar,
coating the separated moist brown sugar crystals in advance of the plow during the reduced centrifuging thereof with invert syrup to increase the invert content thereof to approximately 6%, and
thereafter subjecting the coated brown sugar crystals to further mixing action for more evenly spreading the invert coating thereon.

2. The method of making improved, non-caking brown sugar from normally produced conventional brown sugar, said method comprising the steps of
spinning brown sugar massecuite at sufficient speed to separate a portion of the syrup coating from the brown sugar crystals thereof to reduce the invert content of the brown sugar to approximately 2 to 3% invert,
reducing the spinning action,
reverse spinning the brown sugar at reduced speed,
plowing out the spun brown sugar crystals with retained moisture coating thereon during the reduced reversed spinning of the brown sugar,
coating the separated moist brown sugar crystals in advance of the plow during the reduced reversed spinning thereof by spraying with invert syrup to increase the invert content thereof to approximately 6%, and
thereafter subjecting the coated crystals to further mixing action while being conveyed to more evenly spread the sprayed invert coating thereon.

References Cited in the file of this patent
UNITED STATES PATENTS

| | | |
|---|---|---|
| 1,663,731 | Redlich | Mar. 27, 1928 |
| 2,110,778 | Teatini | Mar. 8, 1938 |
| 2,668,128 | Oxnard et al. | Feb. 2, 1954 |
| 2,818,356 | Shookhoff | Dec. 31, 1957 |
| 2,910,386 | Lachmann | Oct. 27, 1959 |
| 2,910,388 | Lachmann et al. | Oct. 27, 1959 |
| 2,910,389 | Lachmann | Oct. 27, 1959 |